Nov. 11, 1969   SHOZABURO MUROTA ET AL   3,477,690
STEM-CRANKED, CAM-ADJUSTED BUTTERFLY VALVE ASSEMBLIES
Filed Sept. 7, 1966                          2 Sheets-Sheet 1
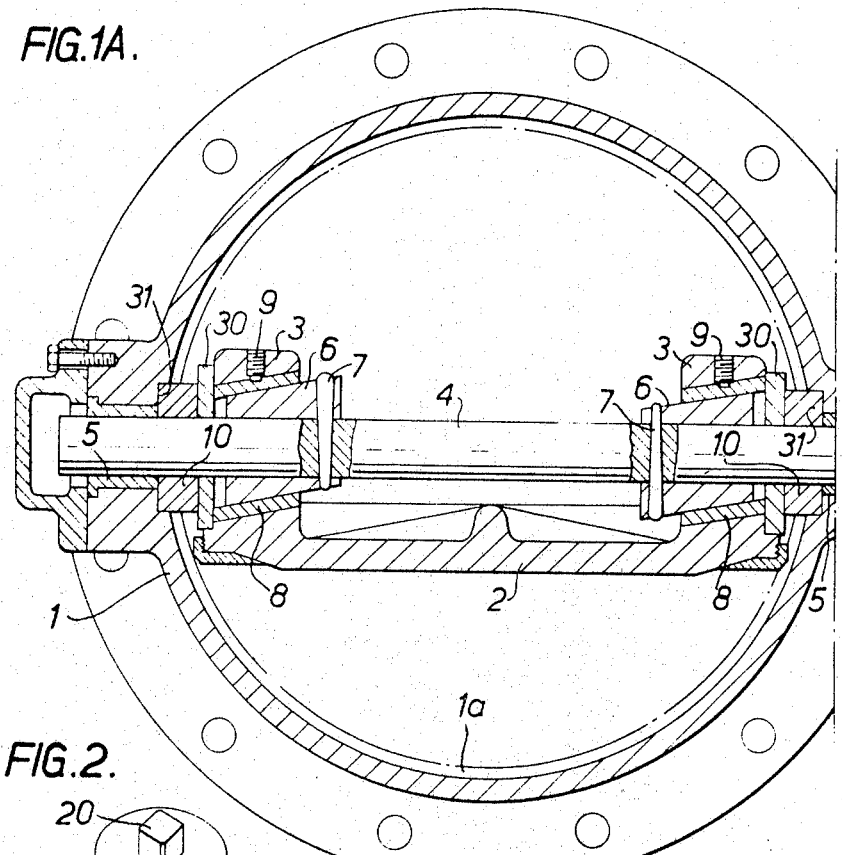
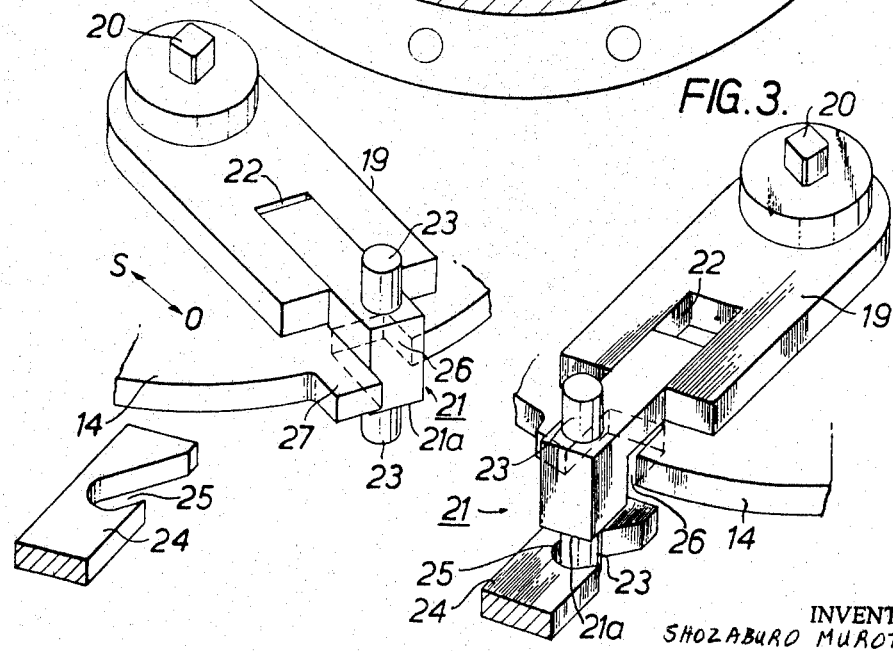
INVENTOR.
SHOZABURO MUROTA and
MASAHARU YOSHIDA Nov. 11, 1969  SHOZABURO MUROTA ET AL  3,477,690
STEM-CRANKED, CAM-ADJUSTED BUTTERFLY VALVE ASSEMBLIES
Filed Sept. 7, 1966  2 Sheets-Sheet 2
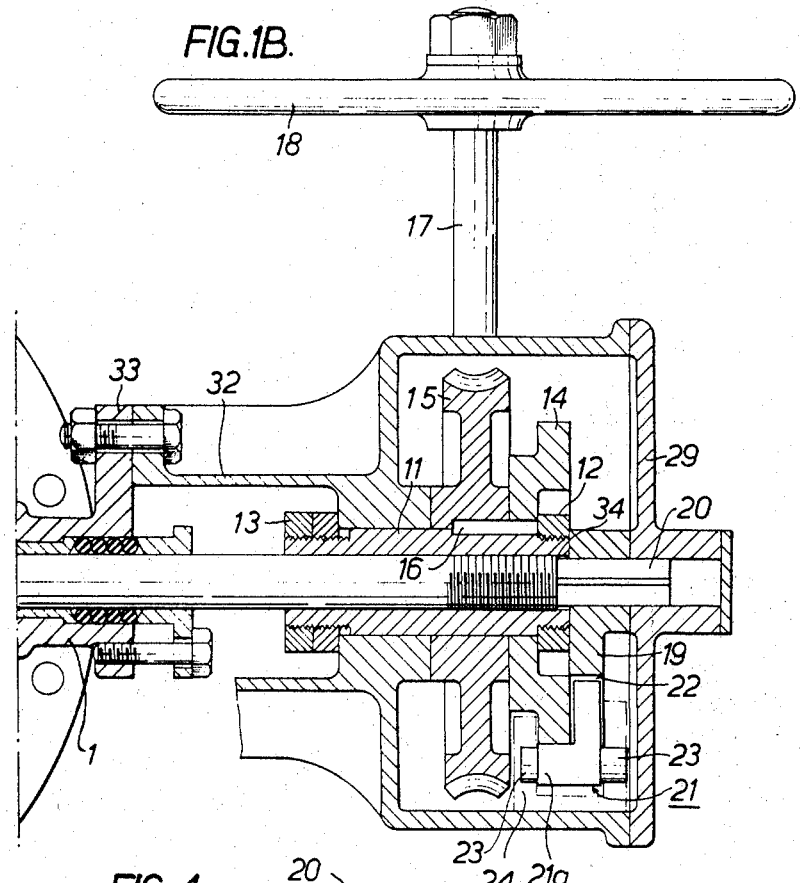
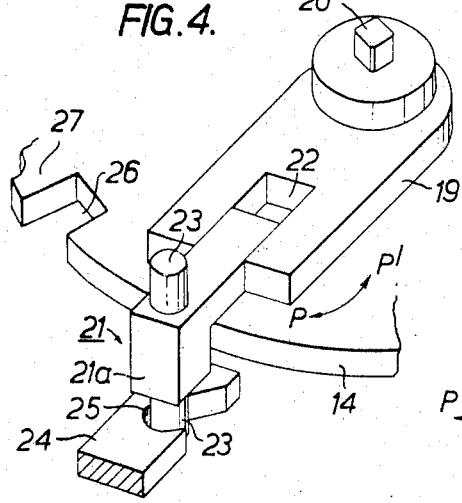
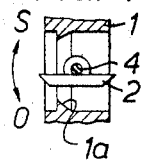
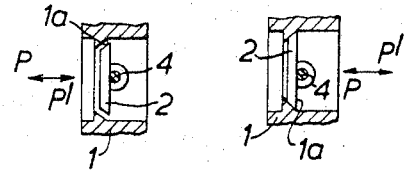
INVENTOR
SHOZABURO MUROTA
and MASAHARU YOSHIDA
BY
Steinberg + Blake
attys 3,477,690
STEM-CRANKED, CAM-ADJUSTED BUTTERFLY
VALVE ASSEMBLIES
Shozaburo Murota, Tokyo, and Masaharu Yoshida, Kawasaki, Japan, assignors to Nippon Chuzo Kabushiki Kaisha, Tokyo, Japan
Filed Sept. 7, 1966, Ser. No. 582,196
Int. Cl. F16k 1/22, 25/00
U.S. Cl. 251—163
8 Claims

ABSTRACT OF THE DISCLOSURE

A butterfly valve assembly in which a valve disc rotates about an axis normal to a central axis surrounded by a valve seat between open and closed angular positions while moving along the axis surrounded by the valve seat to and from engagement with the valve seat. All of the opening movements are brought about from a drive which rotates uniformly in one direction while all of the closing movements are brought about by the same drive during rotary movement thereof in the opposite direction. During closing movement, a transmission transmits motion from the rotary drive through a shaft which carries the valve disc to turn the latter to a position parallel to the plane of the valve seat, this transmission having its action automatically terminated while the continued rotary movement of the drive then acts through a second transmission to displace the shaft which carries the valve disc axially. This axial movement of the latter shaft is then converted by coacting skew cylinders and sleeves respectively connected with the shaft and valve disc into movement of the latter along the axis surrounded by the valve seat into engagement with the latter. The opening movements take place with the reverse of these operations.

---

This invention relates to butterfly valve assemblies.

Although having advantages derived from the simple design and construction as a whole, the conventional butterfly valve has generally a grave drawback in that it lacks frequently full tightness between the pivotable valve disc and its co-operating valve seat when the valve is in its closed position.

It is therefore the main object of the invention to provide efficient butterfly valve assemblies wherein the drawback of the kind above referred to can be substantially obviated.

Thus, starting from a conventional butterfly valve assembly comprising a stationary valve casing carrying therein a ring-shaped valve seat, a valve rod passing through said casing and rotatably mounted therein, a valve disc carried on the rod in the range of the fluid passage bore of the casing and capable of engaging the seat, and a drive mechanism capable of rotating the rod selectively in its valve closing direction or in the reverse direction, we propose a salient improvement therein by providing a pair of skewed cylindrical wedges fixedly mounted on the the rod and arranged to slidably co-operate with skewed corresponding sleeves fixedly mounted on ears formed on the valve disc, the latter being urged positively by the wedges when the rod is longitudinally shifted, upon completion of a rotational valve closing movement of the rod, while still being driven from the drive mechanism.

These and further objects, features and advantages of the present invention will appear from the detailed description by way of an example of a preferred embodiment of the invention as set forth hereinafter with reference to the accmopanying drawings, of which:

FIG. 1A and FIG. 1B constitute in combination a complete drawing, illustrating a longitudinal section of the valve assembly;

FIGS. 2, 3 and 4 are perspective views of control means embodied in a transmission box for the operation of the valve disc, illustrating three different positions of said means; and FIGS. 5A, 5B and 5C are schematic views illustrating three stages of the valve closing operation.

Referring now to the accompanying drawings, FIGS. 1A and 1B show a conventional valve casing 1 which is formed with a valve seat 1a shown only schematically in FIG. 1 by a chain-dotted circle.

A valve member 2, substantially a circular disc when seen from above in FIG. 1A, is provided with a pair of diametrically opposed vertical ears 3, 3. An elongated valve rod 4 passes rotatably through a pair of plain bearings 5, 5 which are mounted in the casing 1. A pair of skewed cylindrical wedges 6, 6 are fixedly mounted on the valve rod 4 by means of tapered pins 7, 7, respectively, in the regions of said ears 3, 3 within the bore of the casing 1 and received rotatably in skewed cylindrical liners 8 which are fitted in the corresponding skew bores formed through the ears 3, 3 and fixedly positioned therein by means of set screws 9, 9. Longitudinal thrusts of the rod 4 which develop during the operation of the valve are positively transmitted through intermediate metal rings 30, 30 to thrust-absorbing members 10, 10, respectively, which are received partially in correspondingly shaped recesses 31, 31 formed in the inside peripheral wall surface of the casing 1.

The driven end of the rod 4 extends a considerable distance into the interior of a transmission box 32 which is bolted to a connection flange 33 formed integrally with the casing 1. A sleeve 11 is rotatably mounted in the box 32, yet positively prevented from any unintentional axial movement by the provision of external and male screw thread which receives positioning nuts 12 and 13, respectively. The sleeve is provided with a female screw portion which is kept in threaded engagement with a male thread portion 34 on the rod 4. On the outside peripheral surface of the sleeve 11 is keyed a cam member 14 and a worm wheel 15 maintained in abutting engagement with each other by the axial pressure exerted by the tightened nut 12. Although not fully shown, a vertical shaft 17 is rotatably mounted in the transmission box and fitted with a worm, not shown, which is kept in meshing engagement with the worm wheel 15. A hand wheel 18 is attached to the upper end of the shaft 17 so as to rotate the latter when an operator desires to do so.

A lever 19 is rigidly mounted on a square portion 20 of the valve rod 4 and formed with a radially extending slot or recess 22 which receives a slide dog 21 as best shown in FIGS. 2 and 3. A recess 26 is formed in the periphery of the cam 14 and adapted to receive normally a lateral projection 21a. For this purpose, spring means may be provided for urging resiliently the slide dog inwardly in the radial direction relative to the rod 4.

Cam member 14 is formed on its periphery with a radial projection 27 in the direct vicinity of recess 26 and upper and lower projections 23 (as viewed in FIGS. 2 and 3) are provided on the slide dog 21, one of the said projections being so dimensioned and arranged that it co-operates engagingly with an inclined groove 25 formed in a sationary cam piece 24 which is rigidly mounted on the inside wall surface of the transmission box 32 as indicated by a chain-dotted line in FIG. 1B.

A cover 29 is attached to the open end of the box 32, although the fixing bolts are not shown, and so shaped as to receive rotatably the square end of the valve rod 4.

In FIG. 2 and FIG. 5A, a double headed arrow affixed with symbols "S" and "O," is provided for showing the closing and opening direction of the valve, respectively. A further double headed arrow is shown in FIG. 4 and FIGS. 5B and 5C respectively, and affixed with symbols "P" and "P'" respectively, for illustrating the pressure exerting direction for valve member 2 against the seat 1a and the releasing direction of the valve from the latter.

In FIG. 1, the valve assembly is shown in its fully opened position, corresponding to FIG. 2.

When it is desired to close the valve, the hand wheel 18 is manually turned in one direction so as to turn, in effect, the valve rod 4 in the closing direction "S." Since in this case, the projection 21a of slide dog 21 is kept in engagement with the recess 26 of cam member 14, the latter is rotated about 90 degrees in unison with the lever 19 which will then be brought to the position shown in FIG. 3. In this position, one of the projections 23 engages the inclined slot 25 and is guided therealong a predetermined distance, whereby the slide 21 is moved radially along the co-operating guide slot 22 until the lower projection 21a, as viewed in FIGS. 2 and 3, disengages completely from the recess 26 while the peripheral surface of cam member 14 rides along the displaced projection 21a so as to prevent undesired return movement of slide 21. Thus, lever 19 and valve rod 4 are positively prevented from further rotation, yet allow the cam member 14 to make a further rotational movement as shown by "P," especially in FIG. 4. Sleeve 11 turns with cam 14 and through coaction with the threaded portion 34 of valve rod 4 axially moves the latter from left to right in FIG. 1. Thus the butterfly valve member 2 is positively urged through the wedge action provided by the pair of hinging assemblies, each comprising members, 7, 6, 8, 9 and 3, to establish a fluid tight closure with the co-operating valve seat 1a. This function will be best understood with reference to FIGS. 5A, 5B and 5C successively.

On the other hand, when the hand wheel 18 is manually turned in the opposite direction, motion is transmitted therefrom through the intermediary of several parts 17, 15 and 16 to cam member 14 and threaded sleeve 11 so as to rotate them in the direction shifting valve rod 4 longitudinally, through the threaded engagement of 34, from right to left as viewed in FIG. 1, so that the wedges 6 establish a slight separation of valve member 2 from its co-operating seat 1a. At the same time, the projection 27 on the cam member 14 will hit the dog slide 21 so as to drive the projection or pin 23 out of the slot 25, whereby the slide 21 returns to its normal position shown in FIG. 2, with the projection 21a being brought into recess 26. Then the parts sleeve 11, rod 4 and valve disc 2 are rotated as a unit in the valve opening direction "O" indicated in FIG. 2.

It will be seen that the valve of the invention includes a generally cylindrical valve housing 1 having its central axis surrounded by the valve seat 1a which is located in a plane normal to the central axis of the housing 1. The shaft 4 has its axis normal to the axis of the housing 1 and this shaft 4 is supported at opposed wall portions of the housing 1, in a fluid-tight manner, for both rotary and axial movement. The valve disc 2 while carried by the shaft 4 for rotary movement therewith is guided by elements 30 and 31 for movement along the central housing axis into and out of engagement with the valve seat while being prevented from participating in the axial movement of the shaft 4. The skewed cylinder and sleeve assemblies 6, 8 form a means responding to the axial movement of the shaft 4 in order to positively displace the valve disc both toward and away from the valve seat. The worm wheel 15 and cam 14 form a rotary drive for transmitting rotary movement to the shaft 4 and thus to the disc 2 through the block 21 and crank 19, while the cam 24 forms a means for automatically interrupting the transmission of motion to the crank 19 from the cam 14 by displacing the block 21 out of the notch 26 of the cam 14. At this time since the cam 24 coacts with the block 21 to maintain the crank 19 and the shaft 4 against rotation, the sleeve 11 coacts with the threads on the shaft 4 to form a means responding to the continued rotary movement of the drive 14, 15 and the preventing of rotary movement of the shaft 4 in order to axially displace the latter.

It will be clear from the foregoing that the butterfly valve assembly shown and described is, in spite of its relatively simple design, capable of establishing a better fluid tight engagement between the valve disc and its co-operating seat in two stages, yet with one and same manual operation of the hand wheel 18. It may well be understood that the novel teaching of the present invention can be equally applicable to power-drive valve assemblies upon making a slight modification in the illustrated embodiment.

We claim:

1. A butterfly valve assembly comprising a cylindrical valve housing having a central axis and carrying in its interior a circular valve seat surrounding said axis and situated in a plane normal thereto, a rotary shaft extending through opposed wall portions of said housing and having its axis normal to the housing axis, means fluid-tightly supporting said shaft at said wall portions of said housing for rotary and axial movement, a valve disc situated in said housing and carried by said shaft for rotary movement therewith, means in said housing coacting with said disc to prevent axial movement thereof with said shaft while guiding said disc for movement with respect to said shaft along the housing axis toward and away from said valve seat, camming means in said housing coacting with said disc and shaft for positively camming said disc toward said valve seat in response to one direction of axial movement of said shaft and for positively camming said disc away from said valve seat in response to an opposite direction of axial movement of said shaft, a crank connected to said shaft for transmitting rotary movement thereto while freeing said shaft for axial movement, rotary drive means, a motion-transmitting block coacting with said rotary drive means and crank for transmitting rotary movement therebetween until said block is displaced to a position out of driving engagement with said rotary drive means and maintaining said crank stationary, cam means coacting with said block for displacing the latter to said position when said rotary drive has turned said shaft to an angular position where said valve disc is parallel to the plane of said valve seat, and axial transmission means coacting with said rotary drive means and shaft and responding to termination of transmission of the drive to said crank during continued movement of said rotary drive means for axially displacing said shaft to bring about movement of said valve disc along said housing axis.

2. The combination of claim 1 and wherein said means for positively camming said disc along said housing axis toward and away from said valve seat includes a pair of cylinder and sleeve assemblies respectively having axes skewed with respect to said shaft.

3. The combination of claim 2 and wherein said skewed assemblies include cylinders fixed to said shaft for rotation therewith and respectively having parallel axes skewed with respect to said shaft, a pair of sleeves respectively slidably receiving said cylinders, and said disc having a pair of ears carrying said sleeves, so that upon axial movement of said shaft said cylinders are displaced with respect to said sleeves for positively camming said disc along said housing axis in opposed directions.

4. In a butterfly valve assembly, a cylindrical housing having a central axis and carrying at its interior a valve seat surrounding said axis, a valve disc situated in said housing for swinging movement to and from a position in a plane parallel to a plane in which said valve seat is located, a rotary shaft carrying said valve disc and extending through opposed wall portions of said housing, means fluid-tightly guiding said shaft for rotary and axial movement, and means coacting with said shaft and disc for positively camming the latter along said axis toward and away from said valve seat in response to axial movement of said shaft in opposed axial directions, respectively, said means for positively camming said disc in both of said directions including a pair of cylinders carried by said shaft and respectively having axes which are skewed with respect to said shaft, and a pair of sleeves carried by said disc and slidably receiving said cylinders.

5. The combination of claim 1 and wherein said rotary drive means includes a worm wheel transmission while said axial transmission means includes a sleeve surrounding said shaft and having a threaded engagement therewith.

6. The combination of claim 1 and wherein said rotary drive means includes a rotary cam formed with a peripheral notch, said crank also being formed with a notch, and said block being located in both of said notches when transmitting the drive from said cam to said crank, said block having a pin projecting therefrom and forming part of said cam means for terminating the transmission of the drive to said crank, the latter cam means including a stationary cam formed with a notch for receiving said pin and displacing said block out of said notch of said rotary cam of said drive means while maintaining said block in said notch of said crank to terminate rotary movement of the latter and said shaft while said cam continues to rotate.

7. The combination of claim 6 and wherein said rotary drive means further includes a worm wheel coaxial with said rotary cam of said drive means, and said axial transmission means including a sleeve keyed to said worm wheel and rotary cam for rotary movement therewith and surrounding and having a threaded engagement with said shaft for axially displacing the latter in response to continued rotary movement of said rotary drive means while said crank and shaft are prevented from rotary movement.

8. For use with a butterfly valve assembly having a valve disc swingable about a given axis while being shiftable along an axis normal to said given axis into and out of engagement with a valve seat, a shaft supported for rotary movement to swing said valve disc and for axial movement to bring about displacement of said valve disc normal to said given axis, a sleeve surrounding said shaft and having threaded engagement therewith for axially displacing said shaft when the latter is prevented from rotating upon rotation of said sleeve with respect to said shaft, a rotary drive cam keyed to said sleeve for rotation therewith, said cam being formed with a peripheral notch, a crank connected to and projecting from said shaft and constrained to turn with said shaft while freeing the latter for axial movement, said crank being formed with a notch, a block situated in both of said notches for transmitting rotary movement from said cam to said crank for turning said shaft, and cam means coacting with said block for displacing the latter out of said notch of said cam to terminate rotation of said crank and shaft while the continued rotation of said cam and sleeve displace said shaft axially.

References Cited

UNITED STATES PATENTS

| | | | |
|---|---|---|---|
| 2,919,885 | 1/1960 | Daigle | 251—163 X |
| 2,934,310 | 4/1960 | Kinney et al. | 251—163 |
| 3,141,648 | 7/1964 | White | 251—163 |
| 3,180,362 | 4/1965 | Muller | 251—163 X |

WALTER A. SCHEEL, Primary Examiner

LEON G. MACHLIN, Assistant Examiner

U.S. Cl. X.R.

251—305